United States Patent [19]
Triplett et al.

[11] 3,834,270

[45] Sept. 10, 1974

[54] FASTENER

[75] Inventors: Lee Triplett, Magna; Wilmer R. Peterson, Kearns, both of Utah

[73] Assignee: Expando Products Company, Salt Lake City, Utah

[22] Filed: July 27, 1972

[21] Appl. No.: 275,789

[52] U.S. Cl. ............................. 85/70, 85/71
[51] Int. Cl. ............................. F16b 13/06
[58] Field of Search .............. 85/70, 71, 77, 78, 67; 85/70, 71

[56] References Cited
UNITED STATES PATENTS

| | | | |
|---|---|---|---|
| 2,236,079 | 3/1941 | Wipper | 85/71 |
| 2,277,885 | 3/1942 | Rodanet | 85/70 |
| 2,753,610 | 7/1956 | Miller | 85/70 |
| 3,013,643 | 12/1961 | Perry | 85/70 |
| 3,735,665 | 5/1973 | Mortensen | 85/71 |

FOREIGN PATENTS OR APPLICATIONS

| | | | |
|---|---|---|---|
| 733,377 | 3/1943 | Germany | 85/70 |
| 704,510 | 2/1954 | Great Britain | 85/70 |
| 343,992 | 3/1931 | Great Britain | 85/67 |

*Primary Examiner*—Edward C. Allen

[57] ABSTRACT

A fastener for securing members together using a rotatable driver tool from one side of the members. The fastener has a holding member locked to an expanding member and a rotatable member is inserted through the holding and expanding members to be threaded into a compression member engagable with the expanding member. Means are provided to expand the compression member as necessary to insure retention of the expanding member.

2 Claims, 8 Drawing Figures

PATENTED SEP 10 1974  3,834,270

FASTENER

BRIEF DESCRIPTION OF THE INVENTION

1. Field of the Invention

This invention relates to devices for securing members together.

2. Prior Art

Devices for holding members together have long been known and many have been proposed in the past. Nut and bolt combinations have often been favored because of the strength and holding power they exhibit. Screws of various types have been proposed and are frequently favored because of their ease of installation. Many kinds of rivets have been developed and have been used because of their low cost. However, the nut and bolt combinations and the rivets used previously have generally had the disadvantage that they must be manipulated from both sides of the members being connected and the screws, while insertable from just one side, have not held as securely as desired.

SUMMARY OF THE INVENTION

The present invention provides a device for locking members together from one side of the members, as securely as such members can be locked together using nut and bolt combinations.

It has also been found that when metal members, such as the overlapping panel sections of prefabricated metal buildings are connected with a metal fastener electrolytic action between the different metals of the panels and the fastener can rapidly destroy the fastener.

In one embodiment there is therefore provided a fastener constructed such that an expanding member will serve as a non-conductive washer totally insulating metal joined members from the metal parts of the fastener used and thereby preventing any possible damage due to electrolysis.

Principal objects of the present invention are to provide a means of positively and easily joining members together with all manipulations necessary to such joining occurring at one side of the members.

Other objects are to provide a fastener that will not damage or mar the surfaces of the joined members and that will provide electrical insulation between the members joined and conductive portions of the fastener.

Still other objects are to provide a low cost, easily used tool for manipulating the fastener to secure members together.

Principal features of the invention include a fastener comprising a holding member frictionally secured within an expandible ferrule; a bolt inserted through the holding member to be threaded into a compression member having a flared skirt in engagement with the ferrule; and a friction means securing the holding member to the ferrule and arranged to flare the skirt as the ferrule expands when the compression member is threaded onto the bolt.

A tool having means for gripping and immobilizing the holding member and a socket for gripping the bolt head is used to secure the fasteners. The means for gripping and immobilizing the holding member is hand held by a user of the tool.

Additional objects and features will become apparent to those skilled in the art from the following detailed description and claims, taken with the accompanying drawings.

THE DRAWINGS

FIG. 1 is a perspective view of the tool used in performing the method of the invention and in securing a fastener of the invention;

FIG. 2, a vertical section through the tool head, taken on the line 2—2 of FIG. 1;

FIG. 3, a perspective view of a fastener of the invention;

FIG. 4, a longitudinal section taken on the line 4—4 of FIG. 3;

FIG. 5, a side elevation view of the fastener of FIG. 3, inserted through members to be secured together shown cut away;

FIG. 6, a view like that of FIG. 5, but showing the fastener secured to hold the members together;

FIG. 7, a view like that of FIG. 5, but partially in longitudinal section, but showing another embodiment of the fastener; and FIG. 8, a view like that of FIG. 6, but showing the fastener embodiment of FIG. 7.

DETAILED DESCRIPTION

Figure 1:
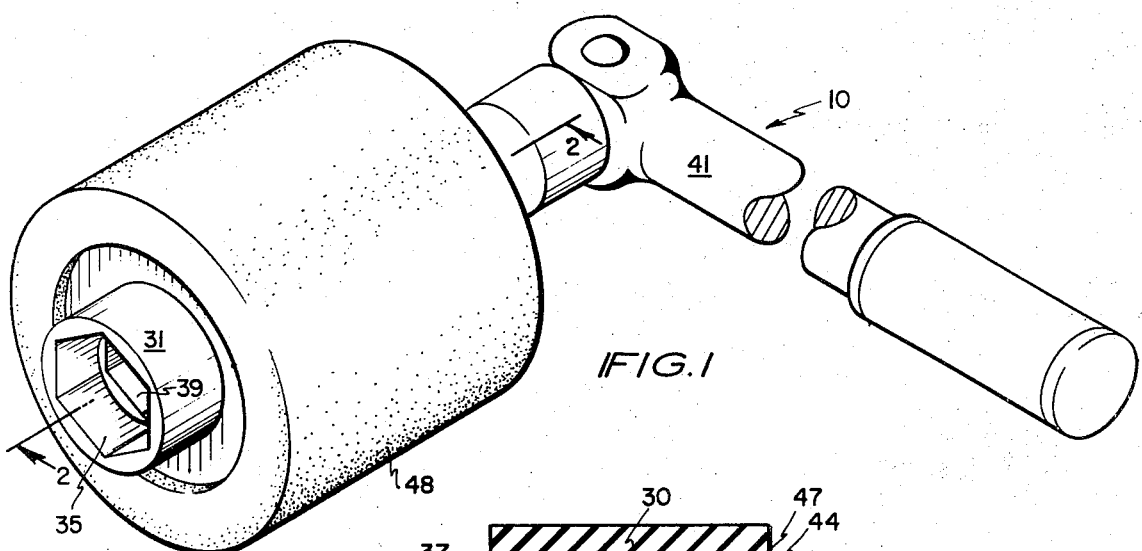
Figure 2:
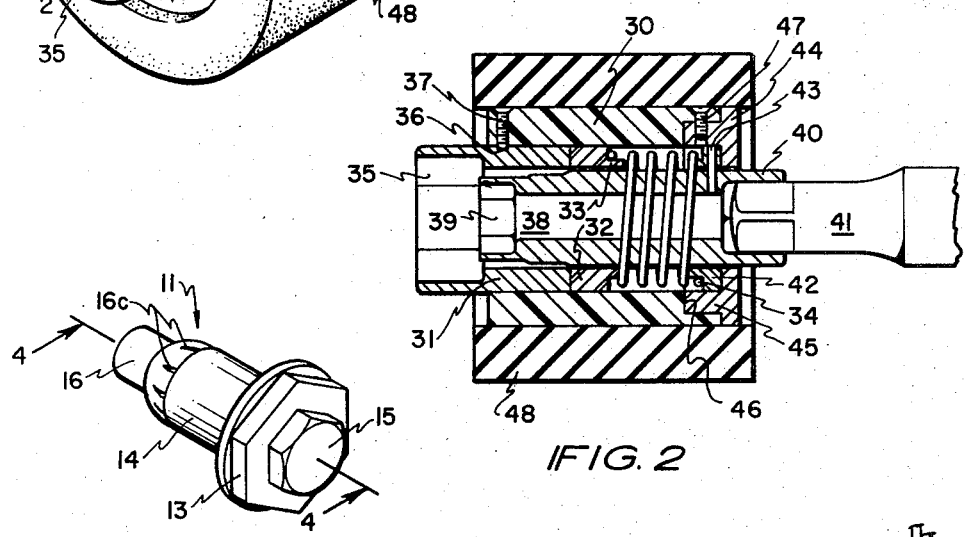
Figure 3:
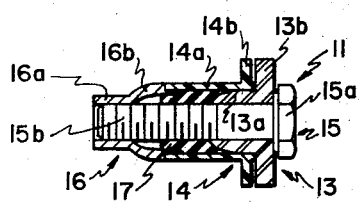
Figure 7:
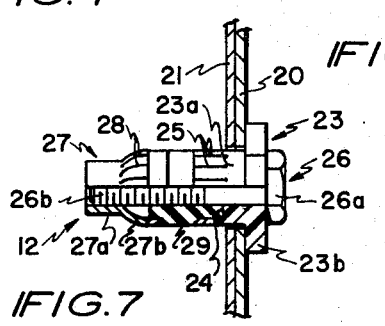
Figure 8:
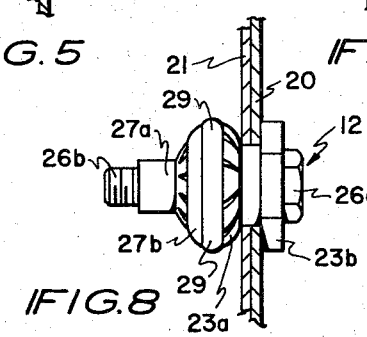

Referring now to the drawings:

In FIGS. 1, and 2, there is shown an inexpensive tool 10 adaptable to secure the fastener 11 of the embodiment shown in FIGS. 3–6 or the fastener 12 of the embodiment shown in FIGS. 7 and 8.

The fastener 11 includes a holding member 13 with a barrel 13a and a head 13b conveniently shaped to be held by a suitable gripping means, as will be explained. The head 13b is shown as being of hexagon configuration, but it will be apparent that other configurations could be used.

An expanding member 14 includes a ferrule 14a with a flange 14b on one end thereof. The flange 14b is positioned closely adjacent to the head 13b of holding member 13. The expanding member is made of a strong deformable material, such as Neoprene or Nylon, and preferably is essentially electrically non-conductive.

A bolt 15, having a head 15a and a shank 15b is arranged with the shank 15b inserted through barrel 13a and ferrule 14a and is threaded into a compression member 16. The compression member includes a nut portion 16a into which the shank 15b is threaded and a skirt portion 16b flared outwardly from the nut portion and engaging the ferrule 14a. Notches 16c are provided in the edge of the skirt portion to insure further flaring as the fastener is operated, in a manner to be described.

An expansible friction lock member 17 surrounds shank 15b, is wedged tightly between the barrel 13a and ferrule 14a and extends into the skirt portion 16b. The friction lock member, which may be of fabric reinforced Neoprene of the type disclosed in U.S. Pat. No. 3,492,909, or the like, effectively locks the barrel to the ferrule and holds the skirt portion relative thereto, so that as the head 13b is held and head 15a is turned the expanding member 14 and compression member 16 are immobilized with the head 13b and the compression member 16 moves further into the shank.

In operation, the compression member 16 and ferrule 14a are inserted through holes 19 provided therefore in members 20 and 21 (which may be overlapped steel or aluminum plates, wallboard, wood, plastic, etc., or combinations thereof) until flange 14b abuts one side of one of the members to be attached. Head 13b is then held fixed and head 15a is turned to rotate the shank 15b. Nut portion 16a travels longitudinally on the threaded shank and as it moves towards head 15a the skirt portion 16b engages, buckles and radially expands the ferrule 14a. At the same time, the lock member 17 is wedged beneath the skirt member to force the skirt member to flare further outwardly, thereby insuring continued contact between the compression member and ferrule and buckling of the ferrule from the end most remote from flange 14b. The notches 16c allow the skirt to expand or flare as the compression member 16 moves onto the lock member 17.

Figures 4, 5, 6:
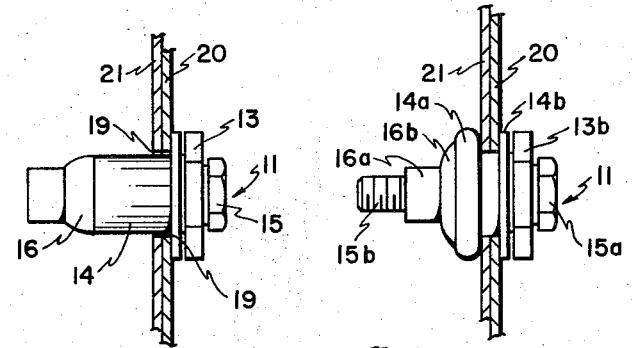

When the fastener 11 is fully secured, as shown in FIG. 6, the flange 14b is flush against one surface of the connected members and serves as an insulator between the surface and the heads 13b and 15a. The portion of ferrule 14a passing through holes in connected members 20 and 21 insulates barrel 13a from the connected members and the expanded portion of ferrule 14a insulates the compression member 16 from the connected members. Thus, if the ferrule is made from a suitably electrically non-conductive material, such as Neoprene or Nylon, it prevents any electrolytic action from occurring between connected metal members 20 and 21 and metal components of the fastener, while at the same time providing a complete seal plugging the aligned holes in the connected members.

In FIGS. 7 and 8, there is shown another embodiment of fastener of the invention. In this embodiment, the fastener 12 includes a holding member 23 having a barrel 23a and a hexagon shaped head 23b on one end thereof. As in the previously described embodiment, it will be apparent that head 23b can be of other shapes, so long as it is capable of being easily held against rotation.

Barrel 23a has an enlarged counterbore 24 in the end thereof opposite head 23b and the end of the barrel wall is split at 25 to allow for expansion and flaring of the barrel wall, as will be explained.

A bolt 26 has its head 26a abutting the head 23b and its shank 26b extending through barrel 23a to be threaded into a nut portion 27a of a compression member 27. A skirt portion 27b is flared outwardly from the nut portion 27a and is split at 28 to allow for expansion as the compression member is moved onto the bolt.

A lock member 29, of fabric reinforced Neoprene or other suitably strong expansible material, fits around bolt 26 and fully into counterbore 24 and partially into skirt portion 27b. The lock member fits snugly into the counterbore and skirt portion and holds them together such that when the holding member 23 is held against rotation and bolt 26 is turned the compression member is frictionally held by the locking member and does not rotate.

When used to secure members, such as those shown at 20 and 21, and heretofore described together, the barrel 23a, lock member 29, compression member 27 and shank 26b are inserted through holes provided therefor in members 20 and 21, head 23b is held and head 26a is turned to move the compression member further onto the shank. As the compression member moves on the shank, the lock member expands radially and the slotted skirt portion 27b and the slotted portion of barrel 23a flare and expand outwardly therewith until the members 20 and 21 are securely clamped between head 23b and the expanded barrel portion.

With either the fastener embodiment of FIGS. 3–6 or the fastener embodiment of FIGS. 7 and 8, it is preferred that a single tool be used to hold the head of the holding member, while at the same time the head of the bolt is turned. The tool 10, shown in FIGS. 1 and 2, has been found very suitable for the purpose.

Tool 10 includes a tubular housing 30 with a sleeve member 31 telescoped into one end thereof. A bushing 32 having a shoulder 33 thereon to receive one end of a coil spring 34 therearound is provided inside housing 30, in abutting relationship with one end of sleeve member 31. The interior of the other end 35 of sleeve member 31 is made to conform to the heads 13b and 23b of fasteners 11 and 12, respectively, and in the embodiment shown is of hexagonal configuration. Recesses 36 (only one of which is shown) are provided in the side wall of sleeve member 31 and set screws 37 (only one of which is shown) are threaded through the housing 30 and into the recesses to hold sleeve member 31 securely therein. While only one set screw 37 is shown it is to be understood that more can be threaded through housing 30 and into recesses 36 provided therefor, as required to immobilize the sleeve member 31 with respect to the housing 30.

A socket 38, mounted to reciprocate and rotate within bushing 32 and sleeve 31 has the usual bolt head receiving end 39 and a handle receiving end 40, to receive an operating handle 41.

A collar 42 encircles the socket and is secured thereto, as by a pin 43 inserted through the collar and the wall of the socket, and the spring 34 abuts the collar.

An end cap 44 has a ring 45 fitted within a shoulder 46 of housing 30 and surrounds the socket such that spring 34 biases the collar 42 against the end cap. Set screws 47 (only one of which is shown) inserted through the wall of housing 30 and into recesses provided therefor in the ring 45 hold the end cap in place.

An outer cover 48 of rubber, soft plastic or other suitable non-slip material is telescoped over or rolled onto housing 30. Cover 48 holds screws 37 and 47 in place and fits so tightly over the housing that it will not slip with respect thereto.

In operation of tool 10 a fastener, such as those identified herein as 11 or 12, is inserted through members to be connected, as previously described. Tool 10 is then positioned such that sleeve 31 fits over the holding member of the fastener, handle 41 is inserted into the handle receiving end of socket 38 and pressure is applied to move the socket 38 towards the members to be connected, against the bias of spring 34. When the end 39 of socket 38 has engaged the bolt head, handle 41 is turned, thereby rotating the socket and turning the bolt head received therein. The outer cover is immobilized, by a user holding it with a free hand and because of the frictional engagement of the outer cover 48 with the housing 30, the housing is also immobilized. Through operation of handle 41 the socket 38 and collar 42 affixed thereto rotate within housing 30 and the socket can be moved longitudinally within housing 30 to maintain engagement with the bolt head as the bolt is threaded into the compression member 16.

The fastener herein described is readily adapted for operation from one side of members being connected and provides a positive, permanent locking structure. There is no necessity for having personnel on both sides of the members being fastened together. Accordingly, the fastener is ideally suited for connecting parts of prefabricated metal buildings and the like, wherein in the past, it has been common to use personnel both inside and outside the building to align, position, hold and tighten nuts and bolts used in the assembly.

The tool herein disclosed is relatively inexpensive to construct, compact, simple to use to hold a holding member while rotating a bolt of a fastener of the type disclosed.

Although preferred embodiments of our invention have been herein described, it is to be understood that the present disclosure is made by way of example and that variations are possible, without departing from the scope of the hereinafter claimed subject matter, which subject matter we regard as our invention.

We claim:

1. A fastener comprising
   a holding member having a head adapted to be secured, whereby said holding member is held against rotation, an opposite end that is slotted to flare outwardly as the compression member is moved thereagainst;
   a bolt having a head and a shank inserted through said holding member;
   a compression member including a nut portion threaded onto said shank and an expansible skirt portion flared outwardly from the nut portion towards the head of the bolt;
   expansible friction lock means closely surrounding said bolt and extending between the holding member and the skirt, and extending between the bolt and said skirt whereby said holding member and said skirt are secured together.

2. A fastener as in claim 1, wherein
   the skirt of the compression member is slotted whereby it flares outwardly as it is moved against the holding member.

* * * * *